Patented Jan. 12, 1943

2,307,813

UNITED STATES PATENT OFFICE 2,307,813

NITROGENOUS HYDROPHILIC ESTER OF A WATER-SOLUBLE POLYBASIC ACID

Truman B. Wayne, Houston, Tex.

No Drawing. Application July 6, 1937,
Serial No. 152,275

5 Claims. (Cl. 260—456)

The present invention relates to the production of new chemical substances possessing valuable properties as wetting, penetrating, emulsifying, and dispersing agents, as well as other uses depending on the properties of interfacial and surface activity. One especially valuable propertiy is the ability of these substances to disperse and/or modify the viscosity of thixotropic gels adapted for use in treating oil-well rotary drilling fluids by adding thereto a small percentage of the product.

Another object of the invention is that of providing valuable protective colloids which are useful in the conditioning of boiler feed water, water used in hot water heating systems, circulatory water cooling systems, and the like, to prevent the adherence of scale to the walls, pipes, and other parts of such systems, and to protect the metallic surfaces of such systems against corrosive gases.

I have discovered that new chemical substances, valuable for the purposes above described, can be obtained by reacting a strong, water-soluble, polybasic acid compound, including chlorides and anhydrides of these acids, with a hydrophile polyhydroxy body of the type hereinafter described, and a strongly basic amine selected from the group comprising straight chain alkyl amines, cycloalkyl amines, alkylated or arylated cycloalkyl amines, or alkylated or cycoalkylated aromatic amines, which contain at least two carbon atoms in each aliphatic radical that is attached directly to the nitrogen atom, where said alkyl radical does not occur between the amino group and an aromatic ring as in the case of benzylamine. Aralkyl amines such as benzylamine are also suitable.

Suitable water-soluble, polybasic acids are the various polybasic phosphoric acids, and their chlorides and anhydrides; concentrated sulfuric acid and chlorosulfonic acid. Certain alkyl sulfonic acids such as ethionic acid are also suitable.

Among the general class of suitable hydrophile polyhydroxy substances are tannin bodies, polyhydroxy phenolic substances, sugars, sugar alcohols, glycols, glycerol, polyglycols, polyglycerols, and polyhydroxy-carboxylic acids, and other similar hydrophile substances possessing acidic functions and/or reactive hydroxyl groups. The polyhydroxy phenols, for instance, are acidic substances and can react without substitution in their hydroxyl groups, or may function as reactive hydroxy bodies with more strongly acidic substances. Commercial tannin extracts such as chestnut extract, quebracho extract, hemlock extract, cutch, etc., for purer chemical substances such as pyrogallol, gallic acid, digallic acid, phloroglucinol, protocatechuic acid, and catechol; and other substances such as mucic acid, tartaric acid, glyceric acid, gluconic acid and other acids produced from sugars or polyglycerols; as well as the sugars and their corresponding alcohols, are examples of suitable hydrophile polyhydroxy substances.

Suitable amines may be selected from the group comprising non-hydroxy alkyl amines such as ethyl amine, propylamine, butylamine, amylamine, and octylamine; cycloalkyl amines such as cyclohexylamine and methylcyclohexylamine; aralkyl amines such as benzylamine, benzyl amyl amine, etc.; hydroxyamines such as mono-, di-, and tri-ethanol or propanol amines, and hydroxy-alkyl-alkylamines such as N-mono-n-butyl - N-hydroxy-ethylamine, 1 - mono - amyl - amino-2-hydroxy-3-propanol, etc., are also suitable, and in many cases are preferred for the reason that they possess reactive hydroxyl groups capable of esterification by the polybasic inorganic acid.

While in every case my new products are prepared by reacting (a) a strongly acid water-soluble polybasic acid, (b) a hydrophile polyhydroxy substance, and (c) a strongly basic amine, to form complex nitrogenous polybasic acid esters, it is obvious that my invention embodies several variations of this type of compound because of differences in structure occasioned by different relative positions of the various groups and linkages within the molecule. To illustrate this point several examples are hereinafter given, each intended to illustrate one embodiment of the invention. It should be understood, however, that I do not wish to limit myself to the specific compounds, proportions of reactive bodies, etc., and methods of preparation herein disclosed, and that they are given merely as examples for the purpose of clearly elucidating the preparation and probable structure of these various embodiments.

*Example 1*

One type of product embodying the structural characteristics and general properties of my new class of chemical compounds is produced by causing a non-hydroxy alkyl or cycloalkyl amine to react with concentrated sulfuric acid, and then esterifying a polyhydroxy body with one or more molecular equivalents of the acid amine salt so produced. As a specific example, 100 parts of cyclohexylamine are slowly introduced into 105 parts of 66° Bé. sulfuric acid during a period of two hours while maintaining the temperature below 35° C. To the amine acid sulfate are added 170 parts of a technical grade of pyrogallol, and the mass is stirred and heated at from 100° to 200° C. for from two to four hours to form the ester. The product so produced is carefully neutralized with ammonium hydroxide, or with any other base, to methyl orange alkalinity. It is a yellowish to brownish powder when entirely dry, and fully soluble in water.

Products corresponding to the above can be made from other alkyl, cycloalkyl, or aralkyl amines, when reacted with a strong polybasic acid, and a polyhydroxy substance.

*Example 2*

Instead of a non-hydroxy alkylamine, a hydroxy alkyl, cycloalkyl, or aralkyl amine may be used. As a specific example, 105 parts of diethanolamine is added to 210 parts of 66° Bé. sulfuric acid over a period of two hours while cooling below 35° C. To the product which is both a salt and ester of the polybasic acid because of esterification of the hydroxyl groups of the amine, is added 190 parts of technical gallic acid and the mass is heated at 100–200° C. to form the complex ester which is probably characterized by the presence of a polybasic acid residue linked to an amine and a polyhydroxy carboxylic body, respectively.

*Example 3*

A polybasic acid such as phosphoric acid is reacted with a hydroxamine such as commercial triethanolamine, and the resulting compound is then reacted with a polyhydroxy substance to form an ester. 215 parts of 90% phosphoric acid are placed in a suitable vessel provided with cooling coils and 140 parts of commercial triethanolamine are slowly added while maintaining the temperature below 50° C. 300 parts of powdered dry quebracho extract containing approximately 72% of tannins are then added and the mass heated at 100–150° C. for two hours. The finished product is a heavy resinous, brown, oily or tarry substance, fully soluble in water.

*Example 4*

A modification of Example 3 produces a similar product but differing slightly in structure and properties. 300 parts of quebracho extract are dissolved in 140 parts of commercial triethanolamine while stirring in a vessel equipped with a strong agitator. Considerable heat is evolved in the formation of the amine salt of the polyhydroxy phenols present in the quebracho extract. After reaction is complete, 215 parts of 90% phosphoric acid are added and the mass heated at 100–150° C. for four hours, or until esterification is complete. The product is neutralized with 20% caustic soda solution or other base yielding a water-soluble salt.

By this procedure is probably prepared a product characterized by direct salt formation between the amine and the polyhydroxy acid substances in the quebracho extract, instead of between the amine and the polybasic acid. The latter then esterifies the hydroxyl groups attached to both the hydroxy amine and the tannin body, thus forming a very complex nitrogenous ester having valuable properties in the various uses above enumerated.

*Example 5*

A mixed aliphatic-cycloaliphatic amine containing a hydroxyl group may be reacted with a polybasic acid anhydride and the product subsequently esterified by a polyhydroxy substance. For example, 160 parts of N-cyclohexyl-N-hydroxy-isopropyl amine are slowly treated with 142 parts of phosphorous pentoxide in a closed, water-cooled vessel, by adding the phosphorous pentoxide in small portions to the very rapidly stirred amine. To this is added 106 parts of diethylene glycol, cooling to prevent excessive reaction at first, then heating finally under reflux to complete the esterification. The mass is dissolved in a small quantity of water and its reaction adjusted to approximate neutrality with any suitable base.

*Example 6*

A product differing somewhat structurally, but possessing equivalent properties and suitability for the purposes herein disclosed, may be prepared by first adding 142 parts of phosphorous pentoxide to 106 parts of diethylene glycol while cooling to prevent excessive reaction and stirring until reaction is complete. The diethylene glycol phosphate ester is then neutralized with a molecular equivalent of mono-, di-, or tri-ethanolamine, or with 160 parts of N-cyclohexyl-N-hydroxy-isopropyl amine as in Example 5.

It should be understood that polymerization and inner-condensation may, and probably do occur in the preparation of the above products. Wherever hydroxy, phenolic, carboxylic, and other similar groups are present, these polymerizations, transformations, and rearrangements of the molecule may be expected. Such modifications, therefore, of the products hereinabove, as well as in the preparation of products from chemical and/or functional equivalents of the above reactive substances, are contemplated in the present invention. Naturally, also, many isomeric forms of these products are possible, as would be expected from a casual inspection of their structural characteristics.

It will be understood that in the claims, a "water soluble polybasic acid" includes its chloride and/or its anhydride.

By the term "amino residue" in the following claims is meant derivatives of amines produced either by salt formation or substitution of its hydrogen atoms by alkyl, cycloalkyl, aralkyl, polyhydric alcohol residues or acyl residues.

It will be understood that where in the claims reference is had to a polybasic acid that this term includes the corresponding halides and anhydrides. The expression "an essentially hydrophile polyhydroxy body," as used in the claims, includes the general class of suitable hydrophile polyhydroxy substances previously described and distinguishes from those bodies which contain a residue from an aliphatic monobasic acid having a molecular weight greater than 150.

The term "residue," as used in the foregoing specification and in the appended claims, refers to that part of an organic body which remains after a reaction wherein the elements of water, or a hydrogen atom from an amino group, have been split off by chemical reaction. It does not refer to the complete degeneration products which would result, for instance, from the complete oxidation or pyrolytic conversion of an organic body into such elemental substances as carbon monoxide, carbon dioxide, water, hydrogen, etc. Thus, if a polyhydroxy substance reacts through a hydroxyl group with a polybasic acid compound, there will remain in the resulting compound residues derived respectively from the polyhydroxy compound and the polybasic acid, the elements of water having been split off through the interaction of the two substances. Likewise, had an amino compound been used instead of the polyhydroxy substance, the amino compound would lose a hydrogen atom, and the amino residue would, therefore, be the original compound minus hydrogen, which is an element of water as described above. Of course, in certain instances where acyl chlorides are used, the residue will be the original chemical compound minus a chlorine atom, which, in this instance, is the equivalent of the hydrogen atom. The term "a residue" does not contemplate cleavage or decomposition products produced by the rupture of hydrocarbon chains or the like, and is confined to reactions occurring at hydroxyl, amino, or acid groups.

I claim:

1. A nitrogenous hydrophilic ester of a water-soluble non-carboxy polybasic acid, characterized by at least one ester radical containing a residue from an essentially hydrophile polyhydroxy body which is characterized by the absence of an acid-reactive amino residue.

2. A nitrogenous hydrophilic ester of a water-soluble, non-carboxy polybasic acid, characterized by the presence of at least one amino residue from an amine selected from the group comprising non-hydroxy alkyl, hydroxy alkyl, cycloalkyl and aralkyl amines, and at least one residue from an essentially hydrophile polyhydroxy substance which is characterized by the absence of an acid-reactive amino residue.

3. A nitrogenous, hydrophilic ester of a water-soluble, non-carboxy polybasic acid body, characterized by the presence of at least one amino residue from an amine selected from the group comprising non-hydroxy alkyl, hydroxy alkyl, cycloalkyl, and aralkyl amines, and at least one residue from an essentially hydrophile polyhydroxy substance which is characterized by the absence of an acid-reactive amino residue.

4. As new interfacial and surface active compounds valuable as wetting, emulsifying, dispersing, penetrating agents, and as protective colloids and corrosion inhibitors, nitrogenous, hydrophilic esters of water-soluble, non-carboxy polybasic acids, characterized by at least one ester radical containing a residue from an essentially hydrophile polyhydroxy body which is characterized by the absence of an acid-reactive amino residue.

5. A viscosity-controlling agent for thixotropic well drilling fluids, comprising a substantial amount of a nitrogenous hydrophilic ester of a water-soluble non-carboxy polybasic acid, characterized by at least one ester radical containing a residue from an essentially hydrophile polyhydroxy body which is characterized by the absence of an acid-reactive amino residue.

TRUMAN B. WAYNE.